United States Patent
Arlein

(10) Patent No.: US 11,021,633 B1
(45) Date of Patent: Jun. 1, 2021

(54) SNOW EQUIPMENT WAX FORMULATION

(71) Applicant: Peter Arlein, Carbondale, CO (US)

(72) Inventor: Peter Arlein, Carbondale, CO (US)

(73) Assignee: mountainFLOW eco-wax LLC, Carbondale, CO (US)

( * ) Notice: Subject to any disclaimer, the term of this patent is extended or adjusted under 35 U.S.C. 154(b) by 0 days.

(21) Appl. No.: 16/734,244

(22) Filed: Jan. 3, 2020

(51) Int. Cl.
  *C09G 3/00* (2006.01)
  *C08L 91/06* (2006.01)
  *C10M 111/04* (2006.01)

(52) U.S. Cl.
  CPC ............... *C09G 3/00* (2013.01); *C08L 91/06* (2013.01); *C10M 111/04* (2013.01); *C08L 2205/025* (2013.01); *C08L 2205/035* (2013.01); *C08L 2207/322* (2013.01); *C10M 2205/183* (2013.01)

(58) Field of Classification Search
  CPC ....... C09G 3/00; C08L 91/06; C08L 2205/25; C08L 2205/035; C08L 2207/322; C10M 111/04; C10M 2205/183
  See application file for complete search history.

(56) References Cited

U.S. PATENT DOCUMENTS

2006/0107870 A1* 5/2006 Barnes .................... C08L 91/06
  106/270
2010/0087345 A1   4/2010 Sparks

OTHER PUBLICATIONS

Winkler-Moser, J.K., Anderson, J., Felker, F.C., Hwang, H.-S., "Physical Properties of Beeswax, Sunflower Wax, and Candelilla Wax Mixtures and Oleogels", J. Am. Oil Chem. Soc. 2019, 96, 1125-1142 (Year: 2019).*

* cited by examiner

*Primary Examiner* — James C Goloboy
(74) *Attorney, Agent, or Firm* — Lewis Roca Rothgerber Christie LLP

(57) ABSTRACT

A snow equipment wax composition including at least 65 wt % of candelilla wax and sunflower wax; at least 20 wt % of pillar blend soy wax; and up to 15 wt % of one or more additional materials selected from the group of additional waxes, natural plant oils, and hydrogenated plant oils.

14 Claims, No Drawings

SNOW EQUIPMENT WAX FORMULATION

FIELD

Embodiments of the present invention relate to waxes for snow equipment such as skis, snowboards, monoskis, snowbikes, snow blades, and any other equipment that is intended to be used to glide across snow.

BACKGROUND

A lubricating wax can be applied to the base or other snow-contacting surface of snow equipment intended to glide across snow. Such wax has been used for hundreds of years to improve the glide characteristics of snow equipment bases, particularly and primarily to overcome three types of friction: dry friction, wet friction, and electrostatic friction. Dry friction is caused by snow crystals rubbing against the base of the ski. Wet friction occurs when there is a high percentage of moisture in the snow and is caused by capillaries, or threads of water, that stick to the base of the ski and decrease speed. Electrostatic friction is caused by the electric properties of snow and the snow equipment base. Particularly, as the snow equipment moves through snow, electrons are transferred between the snow and the snow equipment creating an electric field. This electric field resists change such that as the snow equipment moves forward an electric force opposes this movement. The force is proportional to the charge developed between the snow equipment base and the snow and the distance between them. An effective snow equipment wax minimizes the effects of dry friction, wet friction, and electrostatic friction, while still being easily applicable to the snow equipment and having a sufficient durability to stay on the snow equipment over a desired time period or to travel a certain distance through snow.

A significant majority of snow equipment wax is made from petroleum-derived materials, including but not limited to paraffin and microcrystalline wax. In addition, some snow equipment wax is also made with fluorocarbons, which are a known carcinogen and are often referred to as a "forever chemical" due to their inability to breakdown in nature.

When snow equipment to which wax has been applied is used in snow, the wax can be stripped from the base of the snow equipment by snow crystals. Hence, the wax that is applied to snow equipment can end up in the snowpack and, consequently, the environmentally unfriendly petroleum and fluoro-based chemicals are introduced directly into the environment where they have been shown to subsequently enter the food chain. Accordingly, there is a need for an environmentally-friendly balanced wax formula that matches the performance of a conventional petroleum wax, but that does not contaminate the environment.

SUMMARY

A wax formulation is provided that can be formulated from components of natural origin, and particularly, components that do not include petroleum-derived materials. The wax formulation provides for high-quality lubricity, durability, and applicability to snow equipment.

In one embodiment, the composition includes at least 65 wt % of candelilla wax and sunflower wax; at least 20 wt % of pillar blend soy wax; and up to 15 wt % of one or more additional materials selected from additional waxes, natural plant oils, and hydrogenated plant oils. In one embodiment, the one or more additional materials are all of natural origin.

In further embodiments, the composition may also include at least 4 wt % of carnauba wax and also may include at least 1 wt % of jojoba oil. Further, in some embodiments, the composition may include one or more colorants or fragrances.

In one embodiment, the composition may include at least 38 wt % of candelilla wax and at least 29 wt % of sunflower wax. In other embodiments, the composition may include at least 74 wt % of candelilla wax and sunflower wax and between 88-94 wt % of candelilla wax, pillar blend soy wax, and sunflower wax.

In further embodiments, the composition does not contain beeswax and does not contain non-pillar blend soy wax.

In one embodiment, the composition consists essentially of at least 65 wt % of candelilla wax and sunflower wax; at least 20 wt % of pillar blend soy wax; at least 4 wt % of carnauba wax; and up to 1 wt % of one or more of colorants, fragrances, and antioxidants.

In another embodiment, the composition consists essentially of at least 67 wt % of candelilla wax and sunflower wax; at least 20 wt % of pillar blend soy wax; at least 12 wt % of carnauba wax; and up to 1% wt % of one or more of colorants, fragrances, and antioxidants.

DETAILED DESCRIPTION

Embodiments of the present invention relate to an environmentally-friendly snow equipment wax that has appropriate lubricity, durability, and ease of application properties such that its performance matches the performance of conventional snow equipment waxes which include petroleum and fluoro-based chemicals that can cause undesirable environmental effects, including contamination of the food chain.

As used in the specification and claims of this application, the following terms are specifically defined as follows:

The term "consisting essentially of" or "consist essentially of" refers to a composition that contains no ingredients other than those specifically listed except that an additional ingredient may be present if it is of a character and in an amount that it does not materially change the characteristics of the composition as a whole with respect to ease of application to snow equipment, durability, and lubricity enhancement.

The term "natural origin" or "natural" refers to components, particularly waxes and oils, that are of plant or animal origin, or a hydrogenated oil of plant or animal origin.

The term "snow equipment" refers to skis, snowboards, monoskis, snowbikes, snow blades, and any other equipment that is intended to be used to glide across snow.

The term "pillar blend soy wax" refers to soy wax that has been hydrogenated with a particular blend of oils, soy-based hardeners, and/or other additives such that pillar blend soy wax has a higher melting point than standard soy wax.

When developing a wax, several primary characteristics are taken into account, including lubricity, i.e., the ability of the wax to reduce resistance in different snow conditions, durability, i.e., the ability of the wax to be maintained on the snow equipment to provide an acceptable level of lubricity without having to be reapplied, and ease of application, i.e., the ability of the wax to be applied to the snow equipment, for example, by using a hot wax and scrape technique or other standard techniques.

In order for the wax to be a viable product, the three primary characteristics of lubricity, durability, and applicability should be balanced within the wax because they tend to compete with each other. For example, more durable wax that has a lower coefficient of friction (a "faster" wax) is typically more rigid and thus more difficult to apply. A wax that is easier to apply can be softer and can have a higher coefficient of friction, thus making it "slower" and less durable. It has been found that the wax formulations disclosed herein achieve all three of the primary target characteristics and match the performance of a conventional petroleum wax.

Embodiments of the present wax formulation include at least four natural ingredients which provide the wax with the desired lubricity, durability, and applicability while avoiding the use of petroleum-based products. Particularly, embodiments of the present wax formulation each include candelilla wax, carnauba wax, pillar blend soy wax, and sunflower wax.

In one embodiment, the wax formulation includes at least 85% by weight percentage of candelilla wax, pillar blend soy wax, and sunflower wax. In other embodiments, the wax formulation includes at least 88% and at least 94% by weight percentage of those waxes.

It has been found that pillar blend soy wax is harder, more dense, and has a higher melting point than standard soy wax, thereby making it more durable during snow equipment use and also easier to work with during the scraping process. In one embodiment, pillar blend soy wax is a soy wax that has a melting point of at least 130° F. It has been found that the use of standard soy wax in quantities over 40% does not work well in cold snow and does not have good durability because the wax is soft and easily pulled from the snow equipment during use.

The percentage of candelilla wax, pillar blend soy wax, and sunflower wax in the wax formulations are selected to achieve the desired performance balance of lubricity, durability, and applicability. Particularly, the wax formulation may include from about 34%-44% by weight candelilla wax, from about 27%-37% by weight sunflower wax, and from about 15%-25% by weight pillar blend soy wax. Further, the wax formulations may include between about 3%-15% carnauba wax by weight and may also optionally include jojoba oil up to about 4% by weight.

Other materials that may optionally be incorporated include a colorant to allow differently-formulated waxes intended for different snow conditions to be easily identified by users, and fragrance to provide the wax with a pleasant odor.

Further, to prevent oxidation of oils, if included, and thereby prevent a rancid smell, an antioxidant may be included in the wax composition. However, it was found that the use of jojoba oil does not require an antioxidant. In one embodiment, the total weight percentage of any added colorant, fragrance, and antioxidant does not exceed 1 wt %, and in another embodiment, does not exceed 0.5 wt %.

It is noted that other known ski waxes sometimes contain beeswax. However, it has been found that beeswax becomes tacky and difficult to scrape off when used in quantities that are greater than about 10% by weight in snow equipment waxes.

As provided in the examples below, different wax formulations can be provided depending on the snow conditions where the snow equipment will be used. For example, a "warm" wax can be a softer wax that is generally more water-repellent to combat wet friction. Additionally, a "cool" or mid-temperature wax can be formulated to counteract the effects of both dry and wet friction. Further, a "cold" wax can be a harder wax that is more durable, more abrasion-resistant, and more immune to scratching by sharp snow crystals caused by dry friction.

In one embodiment, to make the wax formulation into a form that can be applied to snow equipment, the ingredients for the wax are melted and mixed together and any fragrance or colorant, if desired, is added. The mixture is poured into a mold at about 175° F. to minimize the amount of shrinking and cracking during cooling. Further, the wax may be insulated during cooling to slow the process and reduce cracking.

The wax formulation was prepared and applied to snow equipment. Separately, a petroleum-based wax was applied to snow equipment and the snow equipment bearing each type of wax was tested. In multiple tests run over two courses, it was found that the inventive natural wax performed the same as the petroleum-based wax and that the results were statistically significant.

Embodiments of the present invention will be described with respect to the following non-limiting examples:

Example 1

A warm temperature wax formulation was made as follows:

| Material | Wt. % |
| --- | --- |
| Candelilla wax | 39% |
| Carnauba wax | 4% |
| Pillar blend soy wax | 20% |
| Jojoba oil | 2% |
| Sunflower wax | 35% |

Each of the ingredients were melted and mixed together. The mixture was then poured into molds at about 175° F. Once hardened, the resulting wax was able to be easily and evenly applied to snow equipment.

Example 2

A cool temperature wax formulation was made as follows:

| Material | Wt. % |
| --- | --- |
| Candelilla wax | 38% |
| Carnauba wax | 10% |
| Pillar blend soy wax | 21% |
| Jojoba oil | 1% |
| Sunflower wax | 30% |

Each of the ingredients were melted and mixed together. The mixture was then poured into molds at about 175° F. Once hardened, the resulting wax was able to be easily and evenly applied to snow equipment.

Example 3

A cold temperature wax formulation was made as follows:

| Material | Wt. % |
| --- | --- |
| Candelilla wax | 38% |
| Carnauba wax | 12% |
| Pillar blend soy wax | 21% |
| Sunflower wax | 29% |

Each of the ingredients were melted and mixed together. The mixture was then poured into molds at about 175° F.

Once hardened, the resulting wax was able to be easily and evenly applied to snow equipment.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A composition comprising:
   at least 65 wt % of candelilla wax and sunflower wax;
   at least 20 wt % of pillar blend soy wax; and
   up to 15 wt % of one or more additional materials selected from the group of additional waxes, natural plant oils, and hydrogenated plant oils.

2. The composition of claim 1, further comprising at least 4 wt % of carnauba wax.

3. The composition of claim 2, comprising at least 98% candelilla wax, carnauba wax, pillar blend soy wax, and sunflower wax.

4. The composition of claim 2, further comprising at least 1 wt % of jojoba oil.

5. The composition of claim 2, further comprising one or more colorants or fragrances.

6. The composition of claim 1 comprising:
   at least 38 wt % of candelilla wax; and
   at least 29 wt % of sunflower wax.

7. The composition of claim 1 comprising at least 74 wt % of candelilla wax and sunflower wax.

8. The composition of claim 2, comprising at least 88% candelilla wax, pillar blend soy wax, and sunflower wax.

9. The composition of claim 2, comprising at least 94% candelilla wax, pillar blend soy wax, and sunflower wax.

10. The composition of claim 1, wherein the one or more additional materials are of natural origin.

11. The composition of claim 1, wherein the composition does not contain beeswax.

12. The composition of claim 1, wherein the composition does not contain non-pillar blend soy wax.

13. A composition consisting essentially of:
    at least 65 wt % of candelilla wax and sunflower wax;
    at least 20 wt % of pillar blend soy wax;
    at least 4 wt % of carnauba wax; and
    up to 1% wt % of one or more of colorants, fragrances, and antioxidants.

14. A composition consisting essentially of:
    at least 67 wt % of candelilla wax and sunflower wax;
    at least 20 wt % of pillar blend soy wax;
    at least 12 wt % of carnauba wax; and
    up to 1% wt % of one or more of colorants, fragrances, and antioxidants.

* * * * *